(12) United States Patent
Teninge et al.

(10) Patent No.: US 7,861,018 B2
(45) Date of Patent: Dec. 28, 2010

(54) SYSTEM FOR TRANSMITTING DATA BETWEEN TRANSMITTER AND RECEIVER MODULES ON A CHANNEL PROVIDED WITH A FLOW CONTROL LINK

(75) Inventors: Philippe Teninge, Gières (FR); Riccardo Locatelli, Grenoble (FR); Marcello Coppola, Sassenage (FR); Lorenzo Pieralisi, Seyssins (FR); Giuseppe Maruccia, Grenoble (FR)

(73) Assignee: STMicroelectronics SA, Montrouge (FR)

(*) Notice: Subject to any disclaimer, the term of this patent is extended or adjusted under 35 U.S.C. 154(b) by 192 days.

(21) Appl. No.: 11/959,150

(22) Filed: Dec. 18, 2007

(65) Prior Publication Data

US 2008/0155142 A1 Jun. 26, 2008

(30) Foreign Application Priority Data

Dec. 22, 2006 (EP) .................................. 06292024

(51) Int. Cl.
*G06F 3/00* (2006.01)
*H03K 11/00* (2006.01)
(52) U.S. Cl. ........................................ 710/61; 375/215
(58) Field of Classification Search ................... 710/61; 375/215
See application file for complete search history.

(56) References Cited

U.S. PATENT DOCUMENTS

| 4,929,850 | A | * | 5/1990 | Breuninger | 327/198 |
| 5,822,571 | A | * | 10/1998 | Goodrum et al. | 713/400 |
| 6,563,888 | B1 | * | 5/2003 | Toriyama | 375/340 |
| 6,977,959 | B2 | * | 12/2005 | Brunn et al. | 375/219 |
| 2003/0189973 | A1 | | 10/2003 | Doblar et al. | 375/215 |
| 2005/0203988 | A1 | * | 9/2005 | Nollet et al. | 709/201 |
| 2007/0130395 | A1 | * | 6/2007 | Hsu | 710/61 |

FOREIGN PATENT DOCUMENTS

| EP | 0 351 779 | 7/1989 |
| EP | 0 547 768 | 6/1993 |
| WO | WO 99/19806 | 4/1999 |

OTHER PUBLICATIONS

A Network on Chip Architecture and Design Methodology Kumar et al. Proceedings of the IEEE Computer Society Annual Symposium on VLSI (ISVSLI'02) Copyright 2002.*

* cited by examiner

*Primary Examiner*—Henry W Tsai
*Assistant Examiner*—Eric T Oberly
(74) *Attorney, Agent, or Firm*—Lisa K. Jorgenson; Allen, Dyer, Doppelt, Milbrath & Gilchrist, P.A.

(57) ABSTRACT

A system for transmitting data includes a transmitter module, a receiver module and a channel provided with a flow control link between the transmitter and receiver modules. The channel provides a first control signal from the transmitter module to the receiver module, and a second control signal from the receiver module to the transmitter module for initiating data transmission. The transmitter or receiver module includes a synchronizer for synchronizing the first and second control signals.

19 Claims, 1 Drawing Sheet

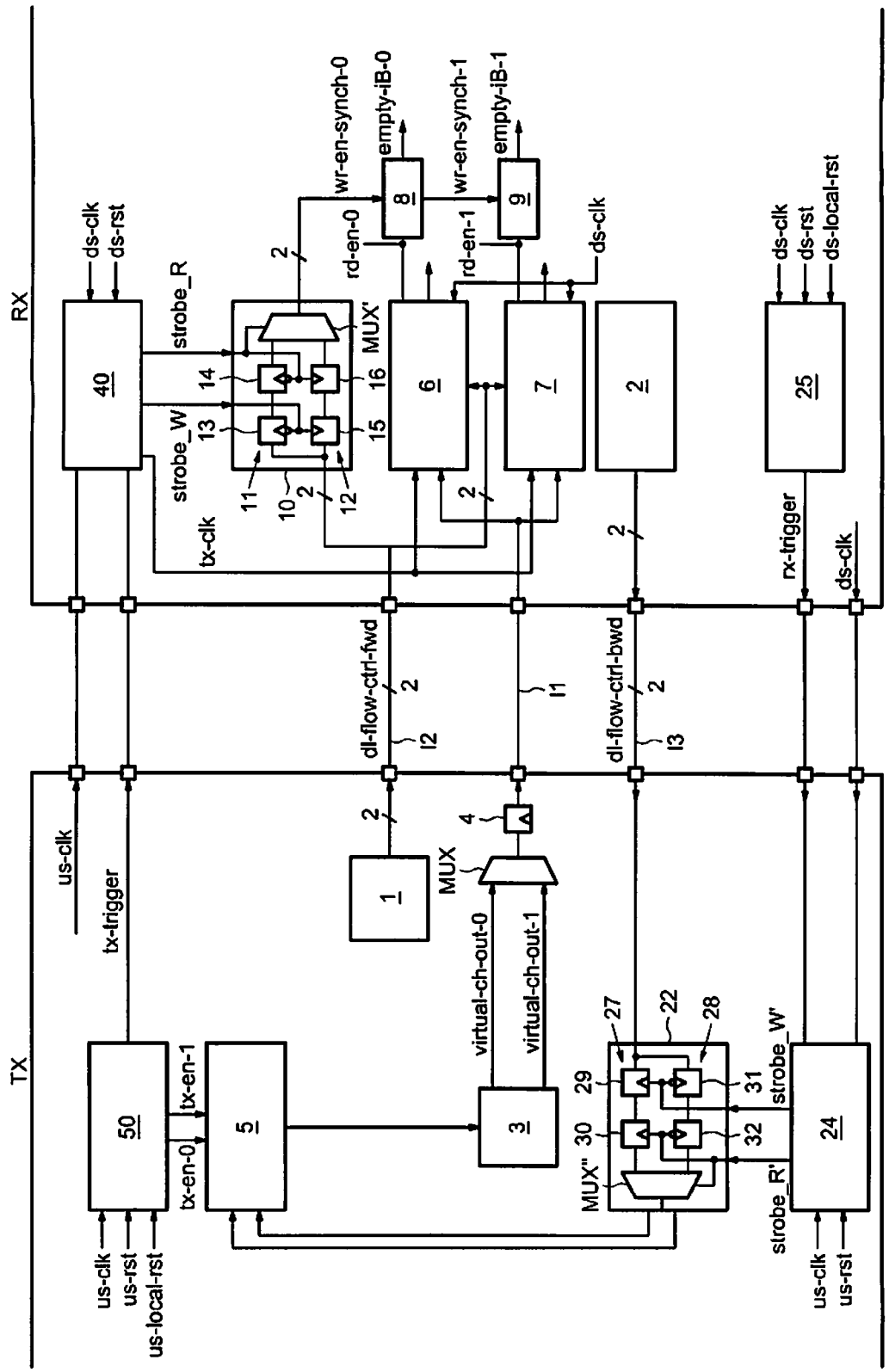

SYSTEM FOR TRANSMITTING DATA BETWEEN TRANSMITTER AND RECEIVER MODULES ON A CHANNEL PROVIDED WITH A FLOW CONTROL LINK

FIELD OF THE INVENTION

The present invention relates to synchronization of communicating blocks in an integrated circuit, and more particularly, to the transmission of data between a transmitter module and a receiver module using a channel provided with a flow control link for transmitting control signals used to control the transmission of data therebetween. The integrated circuit may be a Network-on-Chip (NoC), for example.

BACKGROUND OF THE INVENTION

Current VLSI systems are built according to a System-on-Chip (SoC) concept. System-on-Chip functionalities are the result of the cooperation between several simple modules that are generally selected by the designer from a preexisting library.

The designer role is to map the System-on-Chip functions onto the modules of the library. However, effective communication and interconnection systems are needed to meet suitable performances for the designed SoC system, and in particular, to provide effective communications between the modules of the system.

As system complexity increases, on-chip communications becomes more critical, and current on-chip communication systems tend to become complex arranged infrastructures. In addition, it is usually predicted that, in the next few years, system-on-chips will include hundreds of communicating blocks running at many GHz. Such systems are known as multiprocessor systems-on-chips (MP-SoCs).

Researchers have recently proposed the Network-on-Chip concept (NoC) to overcome the limitations relating to the huge efforts necessary to adequately design on-chip communication systems, even for the MP-SoCs systems. An NoC provides scalable and flexible communication architectures with suitable performances. Moreover, an NoC provides the SoC architects with a tool for designing on-chip communication systems quickly, thus increasing productivity and reducing time to market.

The NoC is a non-centralized architecture that is intended to be physically implemented as a distributed communication infrastructure. NoCs are nevertheless based on a packet switch communication concept and are mainly composed of three NoC modules, namely a router (R), a Network Interface (NI), and a link.

The synchronization issues in a NoC architecture imposes a large scalability limitation, and approaches at the architecture level ready to be industrialized in the near future need to be provided to fully enable NoC deployment. Currently, most of the NoC approaches are fully synchronous so that all the modules have the same clock frequency and data is transferred using traditional synchronous protocols.

Distributing a same clock signal over the entire NoC structure is a big issue. As a matter of fact, a NoC structure is a distributed architecture spread on a chip in such a manner so as to reduce the wiring length of the links. Accordingly, distributing a same clock signal for the entire NoC structure is costly in terms of time or in terms of area since buffers are needed to overcome phase shifting in different areas of the structure.

An alternative approach to some NoC architectures is to build asynchronous links. However, at present, asynchronous communications implies intolerable overhead in terms of wires and area, as well as latency. Moreover, asynchronous design techniques are not supported by standard design industrial EDA flows.

SUMMARY OF THE INVENTION

In view of the foregoing background, an object of the invention is to provide a system for transmitting data on a channel defined by a flow control link between a transmitter module and a receiver module in which there is no need to prescribe one clock signal only for all the integrated circuits.

According to one embodiment, the transmitter module and the receiver module may communicate using a first control signal emitted by the transmitter module to the receiver module. A second control signal may be emitted by the receiver module to the transmitter module to initiate a data transmission. In addition, the system may comprise means or a synchronizer for synchronizing the first and second control signals. The means for synchronizing the first and second control signals may be adapted to synchronize the first control signal to the second control signal at the receiver module side.

The system may comprise a first latch circuit or means for latching and delivering the first control signal in synchronization with the transmitter clock, and a second latch circuit or means for latching data issued from the first latch circuit and delivers the data in synchronization with the receiver clock. For example, the first and second latch circuits may be controlled by first and second control driving signals provided respectively from the transmitter and receiver clocks, and in synchronization with the transmitter and receiver clocks.

The first and second latch circuits may latch the first control signal alternately in the first and second latches. For example, the first latch circuit may be activated by a rising edge, and the second latch circuit may be activated by a falling edge of a corresponding driving signal. The first latch circuit may comprise a first latch, and the second latch circuit may a second latch. The first and second latches may be edge triggered flip-flops.

The system may further comprise a bisynchronous memory adapted to write data in synchronization with the transmitter clock and to read data in synchronization with the receiver clock. The bisynchronous memory may be a FIFO memory, for example. The FIFO memory may be written under the control of the synchronized first control signal issued from the means for synchronizing the control signals, and may be read under the control of the second control signal. The means for synchronizing the first and second control signals may synchronize the second control signal to the first control signal at the transmitter module side.

The system may further comprise a third latch circuit or means for latching and delivering the second control signal in synchronization with the receiver clock, and a fourth latch circuit or means for latching data issued from the third latch and delivering data in synchronization with the transmitter clock.

The third and fourth latch circuits may be controlled by third and fourth control signals respectively provided from the receiver and transmitter clocks in synchronization with the receiver and transmitter clocks. The third and fourth latch circuits may comprise means for latching the second control signal alternately in the third and fourth latch circuits. The third latch circuit may be activated by a rising edge. The fourth latch circuit may be activated by a falling edge of a corresponding driving signal. The third and fourth latch circuits may comprise flip-flops.

BRIEF DESCRIPTION OF THE DRAWINGS other features and advantages will become apparent from the following description, in view of the appended FIG. 1, which illustrates schematically the overall structure of a system for transmitting data in a NoC structure.

DETAILED DESCRIPTION OF THE PREFERRED EMBODIMENTS

In the example illustrated in FIG. 1, the system is intended to transmit data between a transmitter module TX and a receiver module RX in a NoC architecture. The transmitter module TX is upstream to the receiver module RX.

The system can be used to implement a transmission of data in other types of circuits in which the data is transferred using a channel provided with a flow control link used to initiate the transfer of data from the transmitter module TX when the receiver module can accept them. This is namely communication circuits implementing a protocol that is used to ensure the reliability of the transfer.

Generally speaking, the system is intended to provide communications of data between the transmitter module TX and the receiver module RX in which the modules are clocked using an upstream clock signal us-clk and a downstream clock signal ds-clk, respectively. The system is thus intended to synchronize the control signals transferred between the modules TX and RX. The synchronization may be carried out on the reception side. It can also be carried out on the transmission side.

For example, the system may be implemented for transmitting data in a NoC architecture and, in particular, in integrated circuits in which the communicating modules are clocked using clock signals having the same frequency but are out of phase with a constant arbitrary phase difference, which is usually called mesochronous systems.

As shown in FIG. 1, the transmission of data is based on the use of one unidirectional link 11 between the upstream module TX and the downstream module RX. For example, the TX module and the RX module are each implemented within the input/output port of the router of the NoC circuit.

In addition, the communications channel between the TX and RX modules is provided with a control link. This control link has a first connection 12 for transmitting a first control data dl-flow-ctrl-fwd intended to indicate to the receiver module RX that the transmitter module TX is sending or ready to send a valid data. A second control connection 13 is used to transfer control data dl-flow-ctrl-bwd from the receiver module RX to the transmitter module TX to indicate that the receiver module is accepting or ready to accept data.

The first control data dl-flow-ctrl-fwd is provided by a forward flow control generator 1 in the transmitter module. The second control data dl-flow-ctrl-bwd is provided by a backward flow control generator 2 in the receiver module.

In regards to data transferred by channel 11, two virtual channels are implemented, for example. Data is issued from a data generator 3, such as a finite state machine delivering two sets of output data denoted respectively virtual-ch-out-0 and virtual-ch-out-1 to a multiplexer MUX. The multiplexer MUX selects data to be transferred on the channel 11 through a retiming stage 4.

On the transmission side, the system is further provided with a transmitter manager 5 used to control the finite state machine 3. The transmitter manager 5 enables, or on the contrary, disables each virtual channel to transmit data or not to transmit data to the receiver module RX. The virtual channels are each disabled during synchronization of the control signals dl-flow-ctrl-fwd and dl-flow-ctrl-bwd.

On the reception side, the system is provided with two bisynchronous input buffers 6 and 7 to facilitate a clock domain boundary. Each input buffer 6 and 7 is formed by a FIFO memory in which data is written using the upstream clock signal us-clk at the transmission side, and read using the downstream clock signal ds-clk at the reception side.

Two empty signal generators 8 and 9 are respectively associated with the buffers 6 and 7 to generate corresponding empty signals empty-iB-0 and empty-iB-1 indicating that the corresponding input buffer 6 or 7 is empty, to enable writing of data under the control of the backward flow control generator 2.

The first control signal dl-flow-ctrl-fwd is used to detect whether the input buffers 6 and 7 still have room to store data. However, the receiver module RX contains a proper logic that is used to synchronize the control signal dl-flow-ctrl-fwd transmitted by the transmitter module TX.

The transmitter module TX is also provided with such logic that is used to synchronize the second control signal dl-flow-ctrl-bwd. Minimum latency is introduced in the round trip path of the backward control signal, resulting in a minimum size for the bisynchronous input buffers.

In addition, few cycles are used for the necessary synchronization phase that occurs only after a reset sequence. During this short phase, transmission or reception of data is disabled. During steady state, any critical synchronization is required, thus providing robust reliability.

On the reception side, the first control signal dl-flow-ctrl-fwd is synchronized onto the second control signal. This synchronization is based on the use of a two-stage buffer 10. As shown, this buffer 10 is associated with a control block 40 that is responsible for generating a first driving signal strobe_W and a second driving signal strobe_R used to control latching and delivery of data in the first stage and in the second stage of the two-stage buffer 10.

The driving signals are provided based on the transmission clock us-clk and from a trigger signal TX-trigger provided at the transmission side. At the reception side, the driving signals are provided based on the reception clock ds-clk and from a local downstream reset signal ds-rst.

As shown in the FIGURE, the two-stage bugger 10 comprises a first latch circuit 11 and a second latch circuit 12 and a multiplexer MUX' used to deliver the synchronized data to the empty signal generator 8.

Each latch circuit comprises first and second latches, respectively 13, 14 and 15, 16. More particularly, the first latch circuit 11 comprises a first latch 13 which is active on the rising edge of the first driving signal strobe_W, and a second latch 14 which is active on the rising edge of the second driving signal strobe_R.

The second latch circuit 12 is arranged similarly. The second latch circuit 12 includes a first latch 15 which is active on the falling edge of the first driving signal strobe_W, and a second latch 16 which is active on the falling edge of the second driving signal strobe_R. For example, the latches 13, 14, 15 and 16 are formed by flip-flop latches. This is a way to represent these latches with strobe_W and strobe_R used as clock. The actual implementation can use a flip-flop with enables where strobe_W and strobe_R are used.

Accordingly, in the first stage, incoming data is respectively stored alternately in the first latches 13, 15 of the first and second latch circuits 11, 12. In the second stage, data issued from the first stage is respectively stored alternately in the second latches 14, 16 of the first and second latch circuits 11, 12.

The first driving signal strobe_W is synchronous with the transmission side clock signal us-clk, whereas the second driving signal strobe_R is synchronous with the downstream clock signal ds-clk. The first driving signal is responsible for controlling writing of the incoming control data dl-flow-ctrl-fwd in the first stage of the buffer 10. The second drive signal strobe_R is responsible for reading data from the first stage when the input is stable, and activates the multiplexer MUX' to propagate the data in synchronization with the ds-clk clock signal to the empty signal generator B.

To generate the first drive signal strobe_W in synchronization with the upstream clock signal, any circuitry can be used for this purpose. For example, edge trigger D and T flip-flop latches clocked by the us-clk clock signal can be used to provide the first drive signal at a frequency equal to half the frequency of the us-clk clock signal, for example. In addition, a delay gate may be provided for delaying the first driving signal to correspond with the set-up time of the latch circuits.

In addition, generation of the second drive signal strobe_R may be provided by any appropriate circuitry. For example, D flip-flop and T flip-flop latches clocked by the reception side clock signal ds-clk can be used to provide the second driving signal at a frequency equal to half the frequency of the ds-clk clock signal, for example.

The first control signal dl-flow-ctrl-fwd received from the link 11 is synchronous with the upstream clock signal us-clk and is directly used in the bisynchronous input buffers 6 and 7 to enable the writing of the valid data. The synchronized first control signal, in synchronization with the downstream clock signal, is used to control the full or empty state of the buffers 6 and 7 by the empty signal generator B.

As previously indicated, driving signals strobe_W and strobe_R are provided by the control block 40 from the upstream clock signal us-clk and from the trigger signal TX-trigger provided from the transmission side. For this purpose, the transmitter module is provided with a synchronization block 50 for driving the trigger signal TX-trigger, which is a pulse used in the upstream interface for the initialization step. The trigger signal TX-trigger is generated from the upstream clock signal us-clk, from an upstream reset signal us-rst and from a reset local signal us-local-rst.

The synchronization block 50 provides the transmitter manager 5 with transmit driving signals TX-en-0 and TX-en-1 to disable the virtual channels when the trigger signal TX-trigger is pulsed.

The system may further be provided with means to synchronize the second drive signal dl-flow-ctrl-bwd onto the upstream clock signal. The thus synchronized second drive signal is used in the transmitter manager module 5 to enable or disable sending of data at the output channel stage by controlling the finite state machine 3.

This synchronization is based on the use of a two-stage buffer structure 22 which is identical to the structure 10 at the reception side. The synchronization is written by the receiver module RX, and read by the transmitter module TX.

This buffer structure 22 is associated with a control block 24 that is responsible for generating third and fourth driving signals strobe_R' and strobe_W' from the local transmission clock us-clk and from an upstream reset signal us-rst, and on the other end, from the local reception clock ds-clk and from a trigger signal RX-trigger. The trigger signal is generated at the reception side by a synchronization module 25 from the downstream clock signal ds-clk, from a downstream reset signal ds-rst and from a local downstream reset signal ds-local-rst. The synchronization module 25 is identical to the synchronization module 50.

The driving signals strobe_R' and strobe_W' are generated such that they are respectively synchronous with the upstream clock signal us-clk and downstream clock signal ds-clk. As previously indicated, such a control block 24 can be implemented in a known manner. For example, D and T flip-flops respectively clocked by the upstream clock signal and by the downstream clock signal can be used.

In regards to the two-stage buffer 22, this block is identical to the module 10 as discussed above. The two-stage buffer 22 includes a first latch circuit 27 and a second latch circuit 28, and a multiplexer MUX" to deliver the synchronized data to the transmitter manager 5.

Each latch circuit comprises first and second latches, respectively 29, 30 and 31, 32. More particularly, the first latch circuit 27 comprises a first latch 29 which is active on the rising edge of the driving signal strobe_W', and a second latch 30 which is active on the rising edge of the strobe_R' driving signal.

The second latch circuit 28 is similarly arranged. The second latch circuit 28 comprises a first latch 31 which is active on the falling edge of the strobe_W' driving signal, and a second latch 32 which is active on the falling edge of the strobe_R' driving signal. The latches 29, 30, 31 and 32 are formed by flip-flops, for example.

Accordingly, the incoming control data is alternately stored in the first latches 29, 31 of the first stage under the control of the first driving signal, and then stored in the second latches 30, 32 of the second stage under the control of the second driving signal. They are thus transmitted in synchronization with the us-clk clock signal.

From the foregoing, it will be understood that the system according to the embodiment disclosed allows transmission of data on a channel provided with a flow control link in which data is transmitted when the reception side is ready to store the data. This is obtained by synchronizing control data, transmitted by the transmitter module to the receiver module, onto the downstream clock signal.

In addition, control signals transmitted by the receiver module to the transmitter module to initiate the transmission of data are also synchronized, at the transmission side, onto the upstream clock signal. Consequently, the transmission of data between communicating blocks can be successfully carried out even between different parts of an integrated communication system clocked by differing clock signals.

That which is claimed is:

1. A system for transmitting data in a network-on-chip (NoC) comprising:
    a NoC transmitter module;
    a NoC receiver module;
    a channel between said NoC transmitter module and said NoC receiver module for providing
        a first control signal from said NoC transmitter module to said NoC receiver module, and
        a second control signal from said NoC receiver module to said NoC transmitter module for initiating data transmission; and
    said NoC receiver module comprising a multi-stage buffer, and a controller cooperating therewith for synchronizing the first and second control signals, said multi-stage buffer comprising a first latch circuit for latching and delivering the first control signal in synchronization with a transmitter clock signal and being controlled by a first control driving signal based on the transmitter clock signal, and a second latch circuit for latching data provided by said first latch circuit, and delivering the data in synchronization with a receiver clock signal.

2. A system according to claim 1, wherein said second latch circuit is controlled by a second control driving signal that is based on the receiver clock signal signals, with the respective first and second control driving signals being in synchronization with the transmitter and receiver clock signals.

3. A system according to claim 2, wherein said first and second latch circuits are configured for alternately latching the first control signal in said first and second latch circuits.

4. A system according to claim 2, wherein said first latch circuit is activated by a rising edge of the first control driving signal, and said second latch circuit is activated by a falling edge of the second control driving signal.

5. A system according to claim 1, wherein said first latch circuit comprises a first pair of latches, and said second latch circuit comprises a second pair of latches; and wherein each of said first and second pairs of latches comprises edge triggered flip-flops.

6. A system according to claim 1, wherein said NoC receiver module comprises at least one bisynchronous memory for writing data in synchronization with the transmitter clock signal, and for reading data in synchronization with the receiver clock signal.

7. A system according to claim 6, wherein said at least one bisynchronous memory comprises a first-in first-out (FIFO) memory; and wherein said FIFO memory is written under control of the first control signal, and is read under control of the second control signal.

8. A system according to claim 1, wherein said NoC transmitter module comprises a multi-stage buffer for synchronizing at said NoC transmitter module the second control signal to the first control signal.

9. A system according to claim 8, wherein said multi-stage buffer of said NoC transmitter module comprises:
a third latch circuit for latching and delivering the second control signal in synchronization with a receiver clock signal; and
a fourth latch circuit for latching data provided by said third latch circuit, and delivering the data in synchronization with a transmitter clock signal.

10. A system according to claim 9, wherein said third and fourth latch circuits are respectively controlled by third and fourth control driving signals that are respectively based on the receiver and transmitter clock signals, with the respective third and fourth control driving signals being in synchronization with the receiver and transmitter clock signals.

11. A system according to claim 9, wherein said third and fourth latch circuits are configured for alternately latching the second control signal in said third and fourth latch circuits.

12. A system according to claim 10, wherein said third latch circuit is activated by a rising edge of the third control driving signal, and said fourth latch circuit is activated by a falling edge of the fourth control driving signal.

13. A system according to claim 9, wherein said third and fourth latch circuits comprise flip-flops.

14. A network-on-chip comprising:
a transmitter module comprising a state machine for generating data;
a receiver module;
a channel between said transmitter module and said receiver module for providing
a first control signal from said transmitter module to said receiver module, and
a second control signal from said receiver module to said transmitter module for initiating data transmission of the data to said receiver module; and
said receiver module comprising a multi-stage buffer, and a controller cooperating therewith for synchronizing the first and second control signals, said multi-stage buffer comprising a first latch circuit for latching and delivering the first control signal in synchronization with a transmitter clock signal and being controlled by a first control driving signal based on the transmitter clock signal, and a second latch circuit for latching data provided by said first latch circuit, and delivering the data in synchronization with a receiver clock signal.

15. A network-on-chip according to claim 14, wherein said second latch circuit is controlled by a second control driving signal that is based on the receiver clock signal, with the second control driving signal being in synchronization with the receiver clock signal; and wherein said first latch circuit is activated by a rising edge of the first control driving signal, and said second latch circuit is activated by a falling edge of the second control driving signal.

16. A network-on-chip according to claim 14, wherein said receiver module comprises at least one memory for writing data in synchronization with the transmitter clock signal, and for reading data in synchronization with the receiver clock signal.

17. A method for transmitting data between network-on-chip (NoC) transmitter and receiver modules comprising:
providing a channel between the NoC transmitter module and the NoC receiver module for providing
a first control signal from the NoC transmitter module to the NoC receiver module, and
a second control signal from the NoC receiver module to the NoC transmitter module for initiating data transmission; and
synchronizing the first and second control signals using a multi-stage buffer in at least one of the NoC transmitter and receiver modules, and a controller cooperating therewith for synchronizing the first and second control signals, the multi-stage buffer of the NoC receiver module comprising a first latch circuit for latching and delivering the first control signal in synchronization with a transmitter clock signal and being controlled by a first control driving signal based on the transmitter clock signal, and a second latch circuit for latching data provided by said first latch circuit, and delivering the data in synchronization with a receiver clock signal.

18. A method according to claim 17, wherein the second latch circuit is controlled by a second control driving signal that is based on the receiver clock signal, with the first and second control driving signals being in synchronization with the transmitter and receiver clock signals, respectively; and wherein the first latch circuit is activated by a rising edge of the first control driving signal, and the second latch circuit is activated by a falling edge of the second control driving signal.

19. A method according to claim 17, wherein the NoC receiver module comprises at least one memory for writing data in synchronization with the transmitter clock signal, and for reading data in synchronization with the receiver clock signal.

* * * * *

UNITED STATES PATENT AND TRADEMARK OFFICE
CERTIFICATE OF CORRECTION

| | | |
|---|---|---|
| PATENT NO. | : 7,861,018 B2 | Page 1 of 1 |
| APPLICATION NO. | : 11/959150 | |
| DATED | : December 28, 2010 | |
| INVENTOR(S) | : Teninge et al. | |

It is certified that error appears in the above-identified patent and that said Letters Patent is hereby corrected as shown below:

Column 2, Line 38  Delete: "may a"
Insert: --may comprise a--

Column 5, Line 10  Delete: "B"
Insert: --8--

Column 5, Line 31  Delete: "B"
Insert: --8--

Column 7, Line 3  Delete: "signal signals"
Insert: --signal--

Signed and Sealed this
Twelfth Day of July, 2011

David J. Kappos
*Director of the United States Patent and Trademark Office*